United States Patent
Komaki

[11] Patent Number: 5,680,023
[45] Date of Patent: Oct. 21, 1997

[54] METHOD OF MEASURING LINEAR VELOCITY OF DISK

[75] Inventor: Tatsuya Komaki, Atsugi, Japan

[73] Assignee: Mitsumi Electric Co., Ltd., Atsugi, Japan

[21] Appl. No.: 443,694

[22] Filed: May 18, 1995

[30] Foreign Application Priority Data

May 20, 1994 [JP] Japan .................................. 6-107078

[51] Int. Cl.$^6$ .................................................. G05B 19/29
[52] U.S. Cl. ........................ 318/603; 388/912; 388/809; 360/73.04; 318/461
[58] Field of Search ....................... 318/461, 601, 318/72, 603, 78, 571, 434, 599, 615, 635, 650, 81, 600; 388/812, 912, 915, 809, 901, 911, 820, 933; 364/138, 174; 360/32, 73.04; 369/47, 49, 58, 59, 266-267, 239, 176

[56] References Cited

U.S. PATENT DOCUMENTS

| | | | |
|---|---|---|---|
| 4,079,942 | 3/1978 | Kunen | 388/820 |
| 4,439,849 | 3/1984 | Nabeshima | 369/50 |
| 4,652,799 | 3/1987 | Wachi | 388/812 |
| 4,796,249 | 1/1989 | Baas | 360/69 |
| 5,373,495 | 12/1994 | Takada | 369/189 |

FOREIGN PATENT DOCUMENTS

| | | |
|---|---|---|
| 0123946 | of 1984 | European Pat. Off. . |
| 0435646 | 7/1991 | European Pat. Off. . |
| 5-242493 | 9/1993 | Japan . |
| 86-05310 | 9/1986 | WIPO . |

*Primary Examiner*—John W. Cabeca
*Attorney, Agent, or Firm*—Michael N. Meller

[57] ABSTRACT

A method of measuring a linear velocity of a rotating disk on a disk drive system wherein a rotation of a spindle motor is controlled in accordance with a predetermined linear velocity which is generated based on a signal reproduced from the disk to control the initial rotation of the spindle motor. The linear velocity of the disk is determined by measuring one revolution of the disk and from the radius of the disk. The disk drive system includes a servo control system to measure the one revolution of the disk and to generate a servo control signal at a time corresponding to a predetermined number of output pulses from the spindle motor measured during the one revolution time of the disk. The servo control signal is supplied to the spindle motor to control its initial rotation.

5 Claims, 4 Drawing Sheets

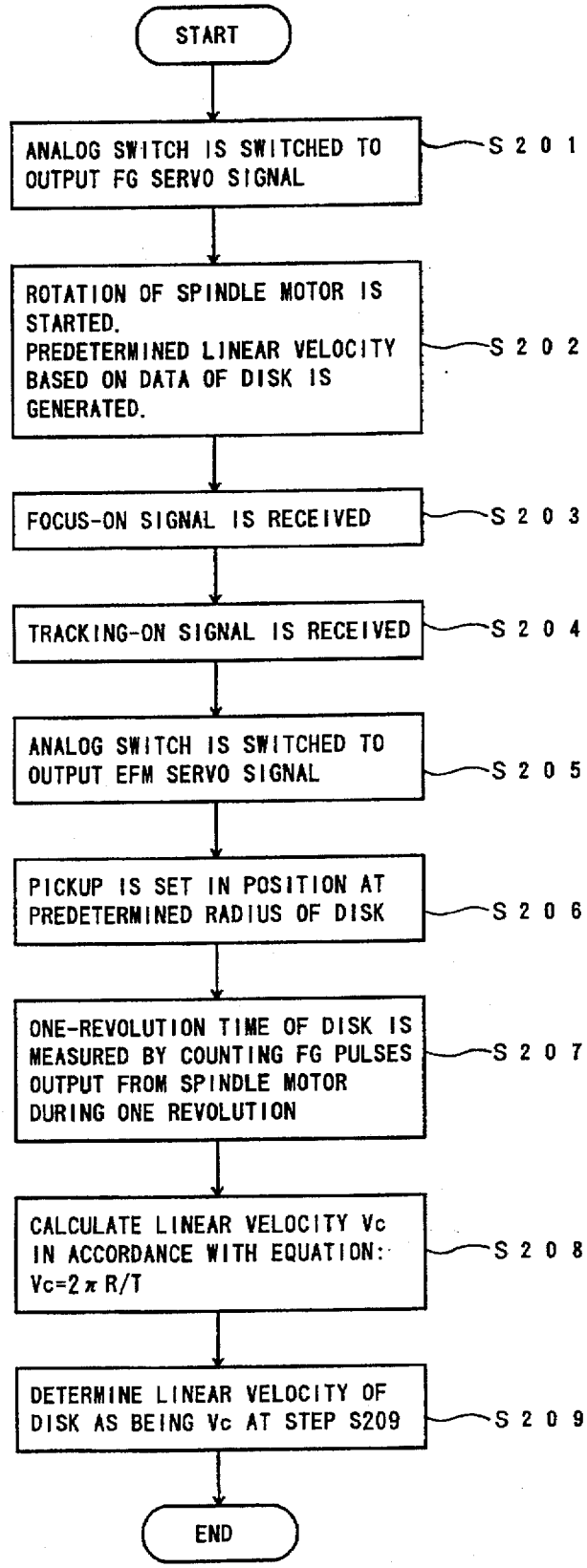

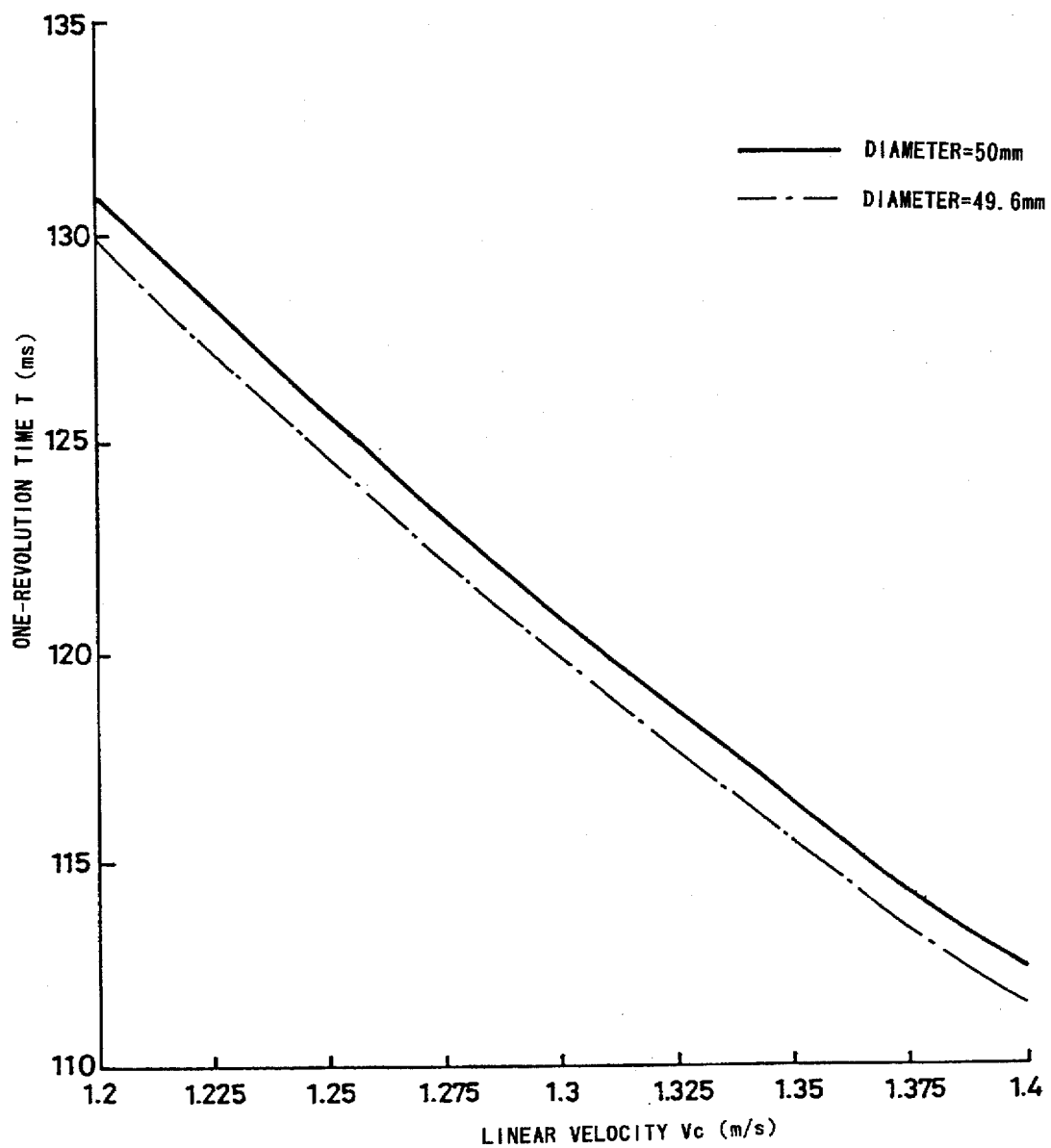

METHOD OF MEASURING LINEAR VELOCITY OF DISK

BACKGROUND OF THE INVENTION

(1) Field of the Invention

The present invention generally relates to a disk velocity measuring method, and more particularly to a method of measuring a linear velocity of a rotating disk on a disk drive system wherein a rotation of the disk is controlled with a constant linear velocity.

(2) Description of the Related Art

In disk drive systems such as CD (compact disk) players, a data access to a compact disk (CD) is performed to read data from or record data onto the disk by irradiating the disk with a laser light beam from an optical pickup. A seek for a desired track of the disk is performed on the disk drive system by controlling a movement of the optical pickup. To perform the seek, the pickup jumps over a number of tracks and is moved to the desired track of the disk, and it is necessary to quickly determine the number of tracks required for the track jump of the pickup.

To quickly determine the number of tracks, it is necessary to quickly detect a velocity of the rotating disk relative to the pickup with a reasonably high accuracy. Hereinafter, the above-mentioned relative velocity of the disk to the pickup will be referred to as the linear velocity, for the sake of simplicity.

In a conventional disk drive system, the number of tracks required for the track jump of the pickup to the desired track is determined based on a constant linear velocity that is predetermined, as follows.

First, suppose that p indicates a track pitch of the disk (which is constant), and R indicates a predetermined radius of the disk (which is the starting position of a program area of the disk). Assuming that the linear velocity V of the disk is constant and two points A and B are located at radiuses $r_1$ and $r_2$ of the disk, the number N of tracks required for the track jump of the pickup between the two points A and B on the disk is defined by $$N = |r_2 - r_1|/p \quad (1)$$

The program area of the disk starts from the innermost track among the tracks of the program area in the disk.

If the linear velocity V is constant, the area of a first circle with the periphery on which an arbitrary point on the disk is located (the first circle is indicated by a radius r of the disk) is defined as being a sum of the moving area of the point when it moves at the constant linear velocity V for a time t along a plurality of tracks with the track pitch p and the fixed area of a second circle with the periphery on which the innermost track of the program area of the disk is located (the second circle is indicated by the predetermined radius R of the disk). The relationship of the areas mentioned above is defined by the following equation.

$$\pi r^2 = \pi R^2 + pVt \quad (2)$$

The above Equation (2) is rewritten into the form to determine the radius r of the disk for the arbitrary point thereon.

$$r^2 = R^2 + (pVt)/\pi \quad (3)$$

$$r = \{R^2 + (pVt)/\pi\}^{1/2} \quad (4)$$

Accordingly, the radius r of the disk for the arbitrary point can be determined in accordance with the above Equation (4).

A total of 8 channels of additional control data is prerecorded on the disk, and they are referred to as SUB codes. SUB-Q codes are included in the SUB codes, and the SUB-Q codes consist of a control code and addresses. This control code indicates the type of the disk. The addresses of the SUB-Q codes include a music number, a music index, a music time code with minute, second and frame values, and a disk time code with minute, second and frame values. The time t in the above Equation (4) is reproduced from the addresses of the SUB-Q codes recorded on the disk.

Assuming that $t_1$ and $t_2$ indicate times at the two points A and B on the disk, the radiuses $r_1$ and $r_2$ of the disk at the points A and B are determined in accordance with the Equation (4) as follows.

$$r_1 = \{R^2 + (pVt_1)/\pi\}^{1/2} \quad (5)$$

$$r_2 = \{R^2 + (pVt_2)/\pi\}^{1/2} \quad (6)$$

Accordingly, the number N of tracks required for the track jump of the pickup between the two points A and B is defined by the following equation.

$$N = 1/p \cdot |\{R^2 + (pVt_2)/\pi\}^{1/2} - \{R^2 + (pVt_1)/\pi\}^{1/2}| \quad (7)$$

In a conventional disk velocity measuring method, the number N of tracks required for a track jump of the optical pickup is determined in accordance with the above Equation (7) based on the constant linear velocity which is predetermined. For example, the middle value (=1.3 m/s) in a range of predetermined linear velocities 1.2 m/s through 1.4 m/s which are in compliance with the requirement of a known compact disk standard is used as the base to determine the track number N mentioned above. The track jump of the pickup is performed based on the determined track number N to carry out the seeking on the conventional disk drive system.

However, as a difference between the actual disk linear velocity and the constant linear velocity (e.g. 1.3 m/s) increases, an error of the actual track jump of the pickup to the desired track of the disk becomes greater than a given reference value. Also, as the distance of the track jump of the pickup increases, the error of the actual track jump becomes greater than the given reference value. If an excessively great error of the track jump takes place, additional track jumps of the pickup must be performed to correct the movement of the pickup. In such a case, the time needed for the seeking on the disk drive system becomes longer.

Thus, in the case of the conventional disk drive system, it is difficult to quickly determine with a high accuracy the number of tracks required for the track jump of the pickup.

Japanese Laid-Open Patent Application No.5-242493 (this publication is based on Japanese Patent Application No.4-43701 filed on Feb. 28, 1992 which was assigned to the assignee of the present invention) discloses a seeking method for a disk apparatus in which the above-described problem is eliminated.

In this seeking method, a linear velocity of each of individual disks on the disk apparatus is measured, the linear velocity of the disk is roughly evaluated from the measured disk velocity, and the number of tracks required for a track jump of the pickup to the desired track of the disk is determined based on the evaluated disk linear velocity.

In a conventional disk velocity measuring method disclosed in the above publication, a pickup is set in a starting position (the diameter is preset to 50 mm) of a program area of the disk, a reverse jump of the pickup over four tracks is performed, and a time required for the pickup to return back to the starting position through the rotation of the disk in a forward rotating direction is measured by using a time counter. The linear velocity of the disk is roughly evaluated by selecting one from among five predetermined disk linear velocities based on the measured time.

Generally, a processing speed of a CD-ROM (compact disk-read only memory) drive system required to read data from or write data onto the CD-ROM is higher than the processing speed of the CD drive system described above. Accordingly, quickly measuring the linear velocity of the disk with a high accuracy is important to allow the seek time of the pickup to keep up with the processing speed of the CD-ROM drive system.

However, the conventional method disclosed in the above publication has to complete a number of steps to calculate the disk linear velocity, and it is difficult to further reduce the seek time of the pickup to reach the desired track with a high accuracy of the seeking result maintained. In addition, it is difficult that the above conventional method provide a high accuracy of the disk linear velocity high enough to realize a seek time of the pickup to keep up with the processing speed of the CD-ROM drive system.

SUMMARY OF THE INVENTION

Accordingly, it is a general object of the present invention to provide an improved disk velocity measuring method in which the above-described problem is eliminated.

Another object of the present invention is to provide a disk velocity measuring method which can detect the linear velocity of the disk with a high accuracy enough to quickly determine the number of tracks required for a track jump of the pickup to a desired track of the disk to allow the seek time of the pickup to keep up with the processing speed of the CR-ROM drive system.

The above-mentioned object of the present invention is achieved by a disk velocity measuring method which includes steps of: generating a predetermined linear velocity based on a signal reproduced from a disk to control a rotating speed of the disk on a disk drive system; setting a pickup in a position at a predetermined radius of the disk; measuring a one-revolution time required for one revolution of the disk when the pickup is set in the position and a rotating speed of the disk is controlled in accordance with the predetermined linear velocity; and determining a linear velocity of the disk based on the measured one-revolution time and the predetermined radius.

The disk velocity measuring method according to the present invention makes it possible to quickly determine the linear velocity of the disk with an error that is smaller than an error with which the linear velocity of the disk can be detected by the conventional method. Accordingly, when the disk velocity measuring method of the present invention is applied, it is possible to quickly determine with a reasonably high accuracy the number of tracks required for a track jump of the pickup to the desired track of the disk on the disk drive system. This enables the seek time of the pickup to keep up with the processing speed of the CD-ROM drive system.

BRIEF DESCRIPTION OF THE DRAWINGS

Other objects, features and advantages of the present invention will become more apparent from the following detailed description when read in conjunction with the accompanying drawings in which:

FIG. 3 is a flow chart for explaining a disk velocity measuring method in one embodiment of the present invention; and FIG. 4 is a graph showing a relationship of the one-revolution time versus the linear velocity.

DESCRIPTION OF THE PREFERRED EMBODIMENT

A description will now be given of a disk drive system in one embodiment of the present invention, with reference to FIG. 2.

Figure 2:
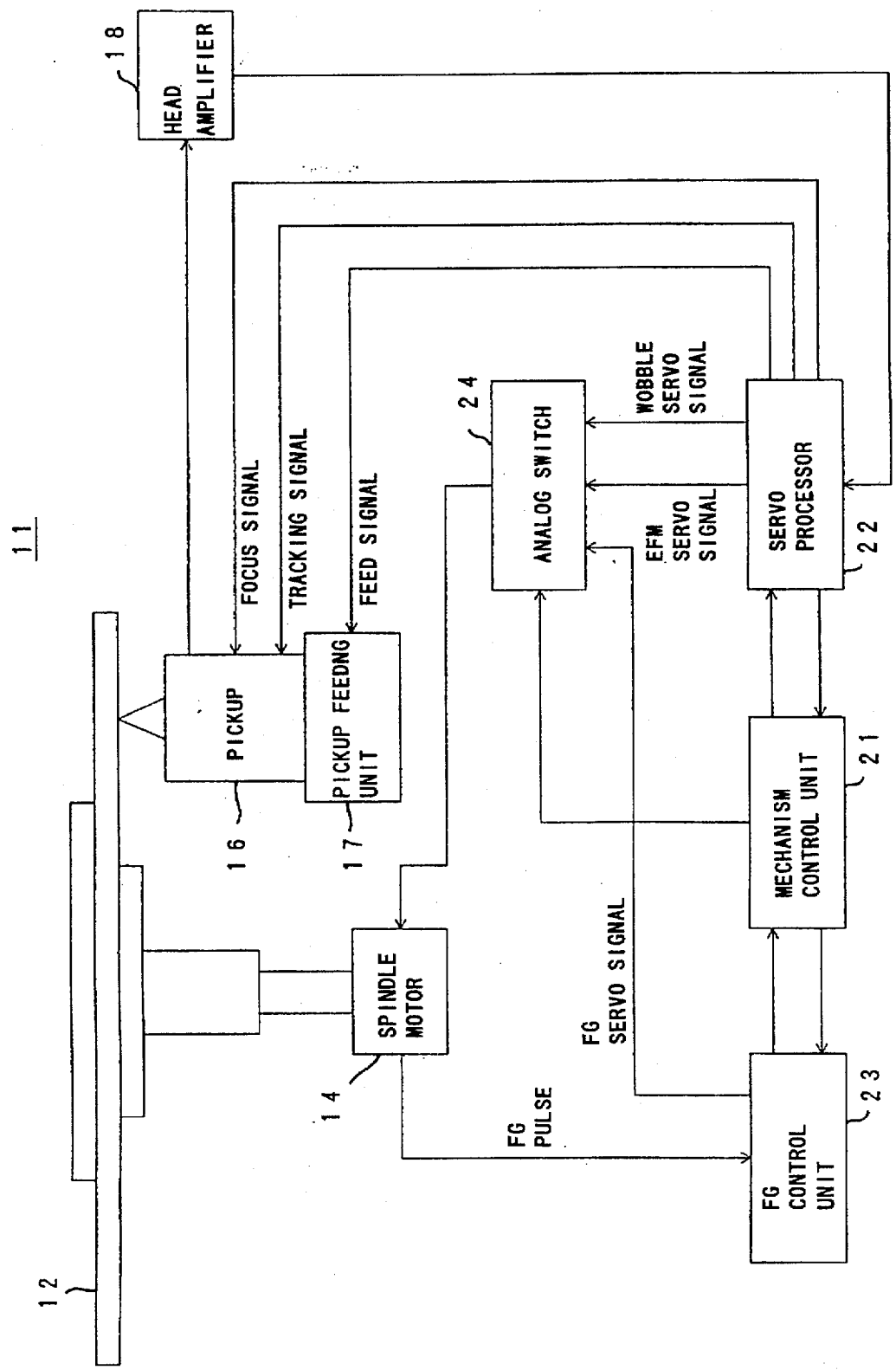
FIG. 2 is a block diagram of a disk drive system to which one embodiment of the present invention is applied.

FIG. 2 shows a CDR (compact disk recordable) system 11. In FIG. 2, a compact disk (CD) 12 is a type of optical disk which is capable of storing large amounts of data. The CDR system 11 is capable of recording data on and reproducing data from the disk 12. Hereinafter, the compact disk will be referred to as the disk and the CDR system will be referred to as the drive system.

In the drive system 12 in FIG. 2, the operations of a spindle motor 14 and an optical pickup 16 are controlled by a control mechanism. The spindle motor 14 rotates the disk 12 at a controlled rotating speed. The pickup 16 irradiates a desired track among tracks of the disk 12 with the laser light beam, and reads data from and writes data onto the disk 12.

The drive system 12 in FIG.2 includes a pickup feeding unit 17 and a head amplifier 18. The pickup feeding unit 17 moves the pickup 16 in a radial direction of the disk 12 to set the pickup 16 in a desired position. The head amplifier 18 converts a signal produced by the pickup 16 into a signal with increased amplitude.

The drive system 11 further includes a mechanism control unit 21, a servo processor 22, an FG (Frequency Generator) control unit 23, and an analog switch 24 which are controlled by the mechanism control unit 21.

The servo processor 22 generates an EFM (Eight-to-Fourteen Modulation) servo signal and a wobble servo signal which are used to perform the respective servo functions. The servo processor 22 generates also a focus signal and a tracking signal by which the focus and tracking control processes for the pickup 16 are performed, and generates a feed signal by which the positioning of the pickup 16 for the pickup feeding unit 17 is performed.

The FG control unit 23 receives FG (frequency generator) pulses from the spindle motor 14, and supplies an FG (frequency generator) servo signal to the spindle motor 14 via the analog switch 24.

The analog switch 24 selects one of several servo control signals from the FG control unit 23 and the servo processor 22 in response to a select signal supplied from the mechanism control unit 21, and outputs the selected signal to the spindle motor 14.

When a select signal for selecting the EFM servo control, output from the mechanism control unit 21, is received, the servo processor 22 generates the EFM servo signal based on a signal reproduced from the disk 12. The reproduced signal from the pickup 16 is supplied from the head amplifier 18 to the servo processor 22. The EFM servo signal from the servo processor 22 is output to the spindle motor 14 through the analog switch 24.

When data is not yet recorded on the disk 12 and a select signal for selecting the wobble servo control, output from the mechanism control unit 21, is received, the servo processor 22 generates the wobble servo signal based on the signal reproduced from the disk 12.

Next, a description will be given of a disk velocity measuring method in one embodiment of the present invention, with reference to FIG. 3.

FIG.3 shows a disk velocity measuring procedure performed on the drive system 11 in FIG. 2. When the drive system 11 starts operating, the irradiation of the laser light to the disk 12 by the pickup 16 is inhibited and an initial rotation of the spindle motor 14 is controlled by supplying the FG servo signal from the FG control unit 23 to the spindle motor 14 in order to avoid deleting or overwriting the original information of the disk 12. If one position of the disk 12 is extensively irradiated with the laser light in a certain amount during the initial operation of the drive system 11, the original information recorded on the disk 12 may be deleted or changed. The FG servo control process is carried out to eliminate the above problem.

After the operation of the drive system 11 is started, step S201 in FIG.3 is performed. In the step S201, the mechanism control unit 21 supplies a select signal to the analog switch 24 so that the FG servo signal from the FG control unit 23 is selected at the analog switch 24. The analog switch 24 is set in a condition for outputting the selected FG servo signal to the spindle motor 14.

In the step S202, the mechanism control unit 21 supplies an FG servo control start command to the FG control unit 23. When the start command from the mechanism control unit 21 is received, the FG control unit 23 starts supplying the FG servo signal to the spindle motor 14 through the analog switch 24. This FG servo signal is transferred to the spindle motor 14, which causes the rotation of the spindle motor 14 to be started. The spindle motor 14 supplies FG pulses to the FG control unit 23 during the initial rotation thereof.

Further, the mechanism control unit 21 at this step generates a predetermined linear velocity of the disk 12 based on a signal reproduced from the disk 12. The reproduced signal output from the pickup 16 is supplied to the head amplifier 18, and it is converted into a signal with increased amplitude by the head amplifier 18. The signal output from the head amplifier 18 is supplied to the servo processor 22. Thus, the reproduced signal is transferred from the servo processor 22 to the mechanism control unit 21.

As described above, the rotating speed of the spindle motor 14 is initially controlled in accordance with the predetermined linear velocity by supplying the FG servo signal from the FG control unit 23 to the spindle motor 14, in order to keep the rotating speed of the disk 12 constant.

When the rotation of the disk 12 is controlled in accordance with the predetermined linear velocity through the above-described FG servo control, the disk drive system 11 supplies a start command to the pickup 16 to start the irradiation of the laser light beam to the disk 12.

In the step S203, the mechanism control unit 21 supplies a focusing command to the servo processor 22. The servo processor 22 supplies a focus signal to the pickup 16 so that a focusing process for the pickup 16 is performed based on a signal sent back from the pickup 16 via the head amplifier 18. When the focusing of the laser light beam on the surface of the disk 12 reaches a predetermined level, a focus-ON signal is supplied from the servo processor 22 to the mechanism control unit 21.

In the step S204, the mechanism control unit 21 supplies a tracking command to the servo processor 22. The servo processor 22 supplies a tracking signal to the pickup 16 so that a tracking process for the pickup 16 is performed based on a signal sent back from the pickup 16 via the head amplifier 18, to adjust the laser light beam from the pickup 16 to the desired track on the disk 12. When the tracking of the laser light beam to the desired track on the disk 12 reaches a predetermined level, a tracking-ON signal is supplied from the servo processor 22 to the mechanism control unit 21.

When both the focus-ON signal and the tracking-ON signal are received, the mechanism control unit 21 supplies a select signal to the analog switch 24, in the step S205, so that the EFM servo signal (or the wobble servo signal) from the servo processor 22 is selected at the analog switch 24. The analog switch 24 is set in a condition for outputting the selected servo signal to the spindle motor 14.

After the step S205, the servo processor 22 generates an EFM servo signal (or the wobble servo signal) based on a signal reproduced from the disk 12 via the head amplifier 18, and the generated servo signal is supplied to the spindle motor 14 through the analog switch 24. The rotation of the spindle motor 14 is controlled to keep the linear velocity of the disk 12 constant by supplying the EFM servo signal (or the wobble servo signal) to the spindle motor 14.

In the step S206, the mechanism control unit 21 supplies a seeking command to the servo processor 22 so that the pickup 16 is set in the starting position of the program area of the disk 12. This starting position of the program area is located at the predetermined radius R of the disk 12. For example, the predetermined radius R=25 mm. This predetermined radius R may arbitrarily be selected from among different radiuses assigned to individual disks.

When the seeking command from the mechanism control unit 21 is received, the servo processor 22 supplies a feed signal to the pickup feeding unit 17 so that the pickup 16 is set by the pickup feeding unit 17 in the starting position of the program area of the disk 12.

After it is checked that the pickup 16 is set in the starting position of the program area of the disk 12, the mechanism control unit 21 supplies a time measuring command to the FG control unit 23 in the step S207. When this command is received, the FG control unit 23 measures a one-revolution time T required for one revolution of the disk 12. In order to measure the one-revolution time T, the time required for a time counter to count a predetermined number of FG pulses (for example, 60 pulses), output from the spindle motor 14 during one revolution of the disk 12, is detected. This one-revolution time T is measured at the FG control unit 23 when the pickup 16 is set in the starting position of the program area of the disk 12 and the rotation of the spindle motor 14 is controlled to keep the linear velocity of the disk 12 constant by supplying the EFM servo signal (or the wobble servo signal) from the servo processor 22 to the spindle motor 14.

In the step S208, the mechanism control unit 21 calculates a linear velocity Vc based on the measured one-revolution time T and the predetermined radius R of the disk. The measured one-revolution time T is supplied from the FG control unit 23 to the mechanism control unit 21. The linear velocity Vc is calculated based on the one-revolution time T in accordance with the following equation.

$$Vc = 2\pi R/T = \pi \cdot 50 \cdot 10^{-3}/T \qquad (8)$$

FIG.4 shows a relationship of the one-revolution time T (ms) versus the linear velocity Vc (m/s). This relationship is represented by the Equation (8). The predetermined radius R, at which the starting position of the program area of the disk 12 is located, ranges from 24.8 mm to 25.0 mm according to the compact disk standard.

In FIG.4, a solid line indicates a relationship of the one-revolution time T versus the linear velocity Vc when the predetermined radius R=25.0 mm (the diameter=50 mm), and a one-dot chain line indicates a relationship of the one-revolution time T versus the linear velocity Vc when the predetermined radius R=24.8 mm (the diameter=49.6 mm)

If the predetermined radius R has a different value in the above range between 49.6 mm and 50.0 mm, an error with which the disk linear velocity Vc is calculated in accordance with the Equation (8) can be in the magnitude of 0.0125 m/s. Accordingly, the disk linear velocity can be determined with the error in the magnitude of 0.0125 m/s in the above embodiment.

In the step S209 in FIG.3, the mechanism control unit 21 determines the linear velocity calculated at the step S208 as being the linear velocity Vc of the disk 12. In the mechanism control unit 21, the determined linear velocity Vc is used as the linear velocity V in the above Equation (7) in order to determine the number N of tracks required for a track jump of the pickup 16.

After the disk velocity measuring procedure in FIG.3 is performed, the disk linear velocity Vc determined by this procedure is used to determine the number N of tracks required for a track jump of the pickup on the disk each time a seeking operation of the pickup 16 for the disk 12 is carried out.

In the above embodiment, the disk linear velocity Vc can be determined with an error in the magnitude of 0.0125 m/s, which is much smaller than the error with which the disk linear velocity is determined by the conventional method. According to the conventional method, it is determined by selecting one from among the predetermined disk velocities with the error in the magnitude of 0.05 m/s. Accordingly, if the disk velocity measuring method of the present invention is applied, it is possible to quickly determine with a higher accuracy the number N of tracks required for a track jump of the optical pickup to the desired track of the disk on the disk drive system. This will increase the access speed of the disk drive system with a reasonably high accuaracy.

In the disk velocity measuring method in the above embodiment, it takes only a total of the time needed for one revolution of the disk and the time needed to calculate the linear velocity Vc. However, in the conventional method disclosed in the above-mentioned publication, the reverse jump of the pickup must be performed to measure the time for several revolutions of the disk. Accordingly, in the above embodiment, the time required for measuring the disk linear velocity is remarkably reduced.

Figure 1:
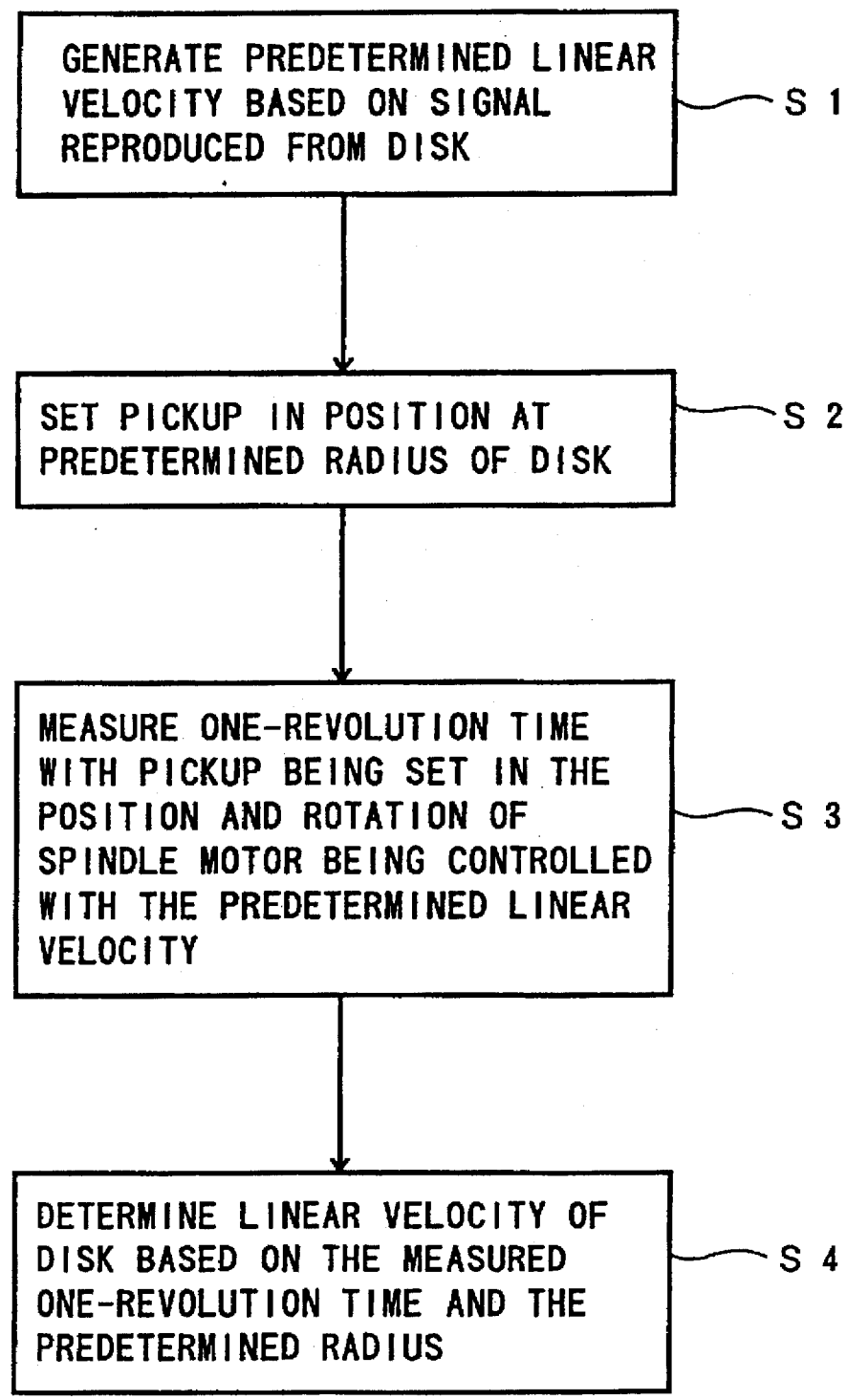
FIG. 1 is a flow chart for explaining a disk velocity measuring method according to the present invention.

FIG.1 shows the disk velocity measuring method according to the present invention. The disk velocity measuring method according to the present invention comprises the steps S1 through S4 shown in FIG. 1. In a disk drive system to which the present invention is applied, a rotation of a rotating disk is controlled by a control unit in accordance with a predetermined linear velocity.

In the step S1, the predetermined linear velocity is generated based on a signal reproduced from the disk, to control a rotating speed of the disk on the disk drive system.

In the step S2, a pickup of the disk drive system is set in a position at a predetermined radius of the disk.

In the step S3, a one-revolution time required for one revolution of the disk when the pickup is located at the position and the rotating speed of the disk is controlled in accordance with the predetermined linear velocity is measured.

In the step S4, a linear velocity of the disk is determined based on the measured one-revolution time and the predetermined radius.

In the disk velocity measuring method according to the present invention, the one-revolution time required for one revolution of the disk when the pickup is set in the above position and the rotating speed of the disk is controlled in accordance with the predetermined linear velocity is measured. The linear velocity of the disk is determined based on the measured one-revolution time and the predetermined radius.

It is possible to quickly detect the linear velocity of the disk with a remarkably small error according to the method of the present invention. Accordingly, the number of tracks required for a track jump of the pickup on the CR-ROM drive system can quickly determined with a reasonably high accuracy, in order to reduce the seek time of the pickup on the disk drive system.

In the above-described embodiment, the procedure of measuring the one-revolution time of the spindle motor makes use of the counting of FG pulses output from the spindle motor. According to the present invention, several alternative methods may be utilized for measuring the one-revolution time of the spindle motor. For example, the arrangement of a sensor which detects the one-revolution time of the spindle motor, the use of a waveform of voltage output from a coil of a brushless motor used as the spindle motor, and the use of a waveform of counter electromotive signal output from a d.c. brush motor used as the spindle motor may be utilized as the alternative methods.

Further, the present invention is not limited to the above-described embodiment, and variations and modifications may be made without departing from the scope of the present invention.

What is claimed is:

1. A method of measuring a linear velocity of a rotating disk on a disk drive system wherein a rotation of a spindle motor is controlled in accordance with a predetermined linear velocity, comprising the steps of:

generating the predetermined linear velocity based on a signal reproduced from the disk to control an initial rotation of the spindle motor;

setting a pickup in a position at a predetermined radius of the disk;

measuring a one-revolution time required for one revolution of the disk when the pickup is set in said position and a subsequent rotation of the spindle motor is controlled to keep the linear velocity of the disk in accordance with said predetermined linear velocity; and determining the linear velocity of the disk based on said measured one-revolution time and said predetermined radius, wherein, during said measuring step, a time required to count a predetermined number of output pulses from the spindle motor during one revolution of the spindle motor is measured by a servo control unit in said disk drive system, and wherein said servo control unit generates a servo signal at a time corresponding to said predetermined pulse count with said servo signal being supplied to the spindle motor to control the initial rotation of the spindle motor.

2. The method according to claim 1, wherein the linear velocity of the disk is determined in said determining step in accordance with the equation:

$$Vc = 2 \cdot \pi \cdot R / T$$

where Vc is the linear velocity to be determined, R is the predetermined radius of the disk, and T is the measured one-revolution time of the disk.

3. The method according to claim 1, wherein the disk drive system comprises a mechanism control unit which determines in said determining step the linear velocity of the disk in accordance with the equation:

$$Vc = 2\pi \cdot R/T$$

where Vc is the linear velocity to be determined, R is the predetermined radius of the disk, and T is the measured one-revolution time of the disk.

4. The method according to claim 1, wherein the disk drive system comprises a servo processor and an analog switch, said analog switch being switched, prior to said setting step, in response to a select signal to selectively output one of two or more servo signals, supplied from said servo processor, to the spindle motor.

wherein, during said measuring step, a time required to count a predetermined number of output pulses from the spindle motor during one revolution of the spindle motor is measured by a servo control unit in said disk drive system, and wherein said servo control unit generates a servo signal at a time corresponding to said predetermined pulse count with said servo signal being supplied to the spindle motor to control the initial rotation of the spindle motor.

5. The method according to claim 1, wherein said measured time being used by said control unit of the disk drive system as said one-revolution time of the disk.

* * * * *